United States Patent
Kikuchi et al.

(10) Patent No.: US 7,280,150 B2
(45) Date of Patent: Oct. 9, 2007

(54) VIDEO CAMERA WITH APERTURE BLADE

(75) Inventors: Kenichi Kikuchi, Hyogo (JP);
Kazuhiko Sugimoto, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 915 days.

(21) Appl. No.: 10/343,478

(22) PCT Filed: Jul. 30, 2001

(86) PCT No.: PCT/JP01/06561

§ 371 (c)(1),
(2), (4) Date: Jan. 30, 2003

(87) PCT Pub. No.: WO02/12956

PCT Pub. Date: Feb. 14, 2002

(65) Prior Publication Data

US 2003/0147001 A1   Aug. 7, 2003

(30) Foreign Application Priority Data

Aug. 3, 2000  (JP)  .............................. 2000-236238

(51) Int. Cl.
*H04N 5/238* (2006.01)
*H04N 5/225* (2006.01)

(52) U.S. Cl. .................................... 348/363; 348/220.1
(58) Field of Classification Search ................ 348/363, 348/220.1, 221.1; 396/450, 124
See application file for complete search history.

(56) References Cited

U.S. PATENT DOCUMENTS 5,606,392 A * 2/1997 Tintera et al. .............. 393/161
5,682,562 A * 10/1997 Mizukoshi et al. ......... 396/159
6,370,336 B1 * 4/2002 Nishinou et al. ........... 396/277
6,819,359 B1 * 11/2004 Oda ........................... 348/247

FOREIGN PATENT DOCUMENTS

| JP | 02-254431 | 10/1990 |
|---|---|---|
| JP | 03-107132 | 5/1991 |
| JP | 03-277875 | 5/1993 |
| JP | 06-250258 | 9/1994 |
| JP | 08-017861 | 8/1997 |
| JP | 08-017862 | 8/1997 |
| JP | 09-230421 | * 9/1997 |

* cited by examiner

*Primary Examiner*—David Ometz
*Assistant Examiner*—Luong T. Nguyen
(74) *Attorney, Agent, or Firm*—Gerald T. Bodner

(57) ABSTRACT

A video camera (10) includes a photographing device (16). The photographing device (16) generates an image signal corresponding to an optical image irradiated on a light-receiving surface, and a monitor (34) displays a moving image based on a generated image signal. An amount of incident light into the photographing device (16) is controlled by an aperture apparatus (14) having an aperture blade that moves to a direction perpendicular to a light axis. A moving amount of the aperture blade is restricted by a predetermined value, and this defines a minimum value of an F number. When the moving image is displayed on the monitor (34), it is prohibited to set to the minimum value of the F number.

9 Claims, 9 Drawing Sheets

VIDEO CAMERA WITH APERTURE BLADE

TECHNICAL FIELD

The present invention relates to a video camera. More specifically, the present invention relates to a video camera provided with a mechanical aperture apparatus in which a size of an opening portion is changed by an aperture blade, such as a digital camera, a video tape recorder combined with a camera.

PRIOR ART

In a mechanical aperture apparatus such as a Galvano aperture apparatus, a size of an opening portion of an aperture blade, i.e., an F number is feedback-controlled based on an output signal of a sensor that detects a brightness of an object or a luminance component of an image signal outputted from a photographing device. This adjusts the F number in such a manner that an incident light amount becomes an optimum value.

In such the aperture apparatus, the aperture blade is driven in such a manner that a pin formed on the aperture blade is pressed against a terminal of a long hole to which the pin is attached when setting the F number to a minimum value. However, when pressing the pin against the terminal, maximum voltage of a driving capability is outputted from a driver of the aperture apparatus, thus giving rise to a problem that a consumed electricity becomes large.

Meanwhile, in an electronic still camera that uses an aperture apparatus as a mechanical shutter apparatus by fully closing the aperture blade in high speed by reverse energization, responsive characteristic of the aperture blade is quite different between a case that the aperture blade is fully closed from a state that the pin is pressed against the terminal, and a case that the aperture blade is fully closed from a state that the pin is set to a position immediately before contacting the terminal. In general, although a sensor for detecting the F number is incorporated in a camera, it is impossible to distinguish the state that the pin is pressed against the terminal, and the case that the pin is set to the position immediately before contacting the terminal because a characteristic of the sensor differs. As a result, it was not possible to exactly control an exposure time period in a state that the F number is set to a vicinity of the minimum value.

Furthermore, in an aperture apparatus in which the aperture blade is feedback-controlled based on the F number detected by a hole element, a transient response by a hole effect occurs to an output of the hole element if a moving amount of the aperture blade is large. As a result, this led to a problem that the aperture amount is not exactly controlled.

SUMMARY OF THE INVENTION

Therefore, it is a primary object of the present invention to provide a novel video camera.

It is another object of the present invention to provide a video camera capable of preventing a consumed electricity from increasing in an aperture control.

It is still another object of the present invention to provide a video camera capable of exactly controlling an exposure time period when using an aperture apparatus as a mechanical shutter apparatus.

It is yet still another object of the present invention to provide a video camera capable of exactly controlling an aperture amount.

A video camera according to the present invention, comprises: an image sensor for generating an image signal corresponding to an optical image irradiated onto a light-receiving surface; a display means for displaying in real time a moving image based on the image signal; an aperture blade for adjusting an amount of an incident light into the image sensor by moving toward a direction perpendicular to a light axis; a restricting member for restricting a moving amount of the aperture blade by a predetermined value in order to define a minimum value of an F number; and a prohibiting means for prohibiting a setting of the F number to the minimum value when the moving image is displayed.

The image sensor generates an image signal in response to an optical image irradiated onto a light-receiving surface, and the display means displays a moving image based on a generated image signal. An amount of an incident light into the image sensor is adjusted by the aperture blade that moves toward a direction perpendicular to a light axis. A moving amount of the aperture blade is restricted by a restricting member by a predetermined value, which defines a minimum value of the F number. When the moving image is displayed by the display means, a setting of the F number to the minimum value is prohibited.

Preferably, the aperture blade has a hole extending to a moving direction, and the restricting means has a protruding portion engaged with the hole. The moving amount of the aperture blade is restricted as a result of a terminal of the hole contacting the protruding portion.

In a case that power is transmitted to the aperture blade by a motor, it is possible to restrain a consumed electricity by prohibiting a setting of the F number to the minimum value.

According to the present invention, a video camera that adjusts an exposure amount of an image sensor in response to an exposure adjusting instruction, and records a still image signal generated by the image sensor in response to a recording instruction, which is after the exposure adjusting instruction, comprises: an aperture blade for adjusting an amount of an incident light into the image sensor by moving toward a direction perpendicular to a light axis; a controlling means for controlling the aperture blade in order that an F number is out of a predetermined range when the exposure adjusting instruction is applied; and a cutting-off means for cutting-off an incident light into the image sensor by fully closing the aperture blade when the recording instruction is applied.

An amount of the incident light into the image sensor is adjusted by the aperture blade that moves toward a direction perpendicular to the light axis. When the exposure adjusting instruction is applied, the controlling means controls the aperture blade in such a manner that the F number is out of the predetermined range. When the recording instruction is applied after the exposure adjusting instruction, the aperture blade is fully closed by the cutting-off means. This cuts-off the incident light into the image sensor.

In a case of defining a minimum value of the F number by restricting the moving amount of the aperture blade by a predetermined value, and cutting-off the incident light by transmitting power to the aperture blade, the predetermined range is present in the vicinity of the minimum value. Preferably, the aperture blade has a hole extending toward a moving direction, and the restricting member has a protruding portion attached to the hole. The moving amount of the aperture blade is restricted as a result of the terminal of the hole contacting protruding portion.

In the vicinity of the minimum value, a required time period for the aperture blade to fully close drastically varies. It makes it possible to exactly control the exposure time period by controlling the aperture blade in such a manner that the F number is out of such the range.

In a case of calculating the optimum F number that defines an optimum exposure amount when the exposure adjusting instruction is applied, and setting the exposure time period that defines a predetermined F number and the optimum exposure amount when the optimum F number is included in the predetermined range, the controlling means controls the aperture blade so as to indicate a predetermined F number. It is noted that preferably the predetermined F number is a minimum F number.

A video camera according to the present invention, comprises: an image sensor for generating an image signal corresponding to an optical image irradiated onto a light-receiving surface; an aperture blade for adjusting an incident light amount into the image sensor by moving toward a direction perpendicular to a light axis; a calculating means for calculating an optimum F number of the aperture blade based on the image signal; and a changing means for gradually changing the F number of the aperture blade to the optimum F number.

The image sensor generates the image signal corresponding to the optical image irradiated onto the light-receiving surface, and an aperture member adjusts an incident light amount into the image sensor by moving toward a direction perpendicular to the light axis. If the calculating means calculates the optimum F number of the aperture blade based on the image signal, the F number of the aperture blade is gradually changed to the optimum F number by the changing means.

In a case that a voltage signal corresponding to the F number of the aperture blade is outputted from a hole element, the changing means changes the F number based on the voltage signal. If one time of a change amount of the F number is large, a level of the voltage signal is changed by a hole effect. However, if the F number is to be gradually changed to the optimum F number, the hole effect is restrained, thus possible to exactly control the aperture amount.

In a case that the aperture blade is moved by the motor, it is possible to appropriately drive the aperture blade irrespective of a hysteresis characteristic of the motor if the F number is to be changed only to one of a first direction in which a numerical value decreases, and a second direction in which a numerical value increases.

Preferably, the image sensor outputs a still image signal when a recording instruction is applied, and the calculating means calculates the optimum F number in response to the exposure adjusting instruction, which is prior to the recording instruction.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
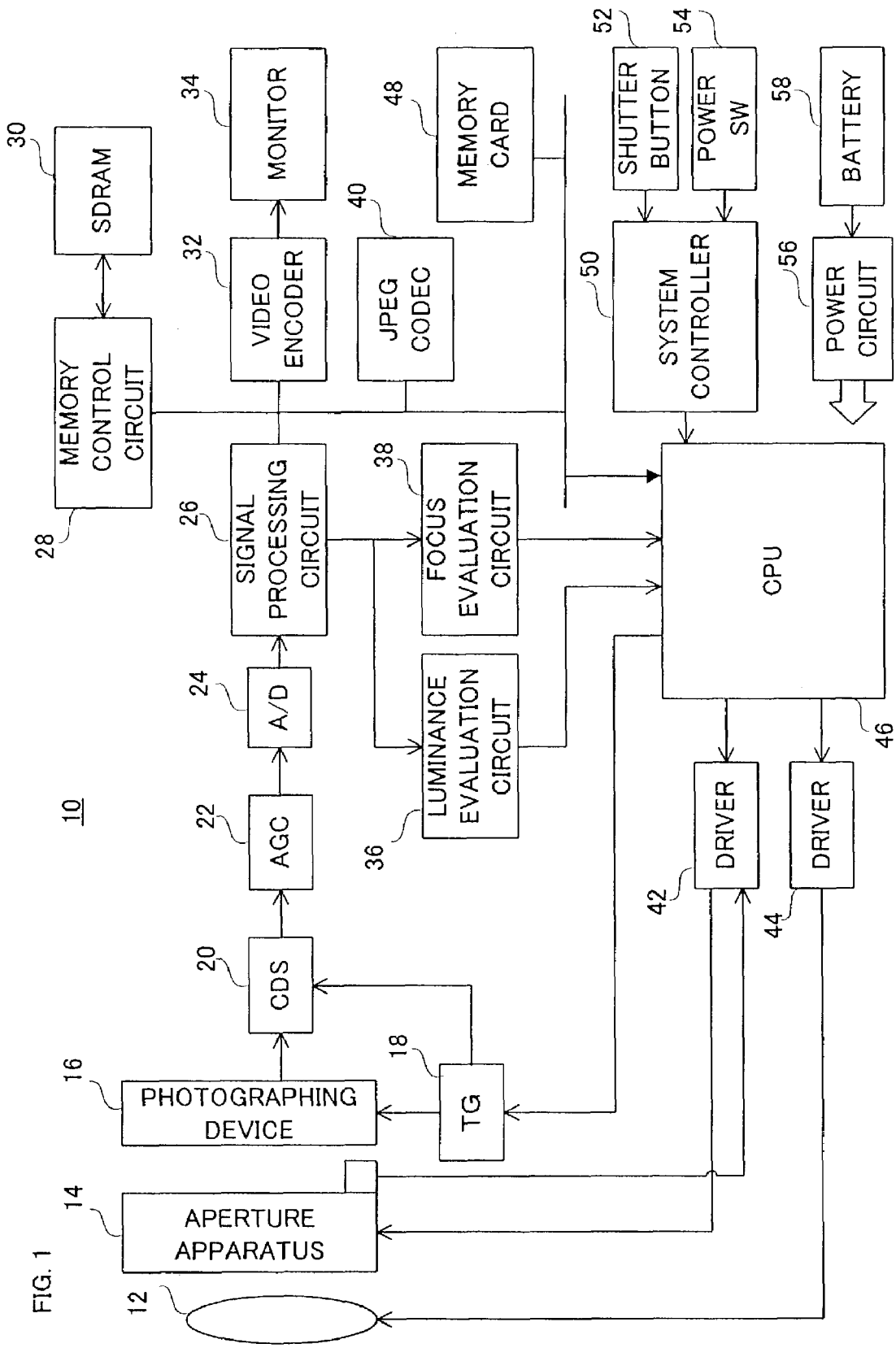
FIG. 1 is a block diagram showing one embodiment of the present invention.

Referring to FIG. 1, a digital camera 10 in this embodiment includes a focus lens 12 and an aperture apparatus 14. An optical image of an object is incident on a light-receiving surface of a photographing device 16 through the members. It is noted that either type of image sensors, a CCD type or a CMOS type, may be adopted as the photographing device 16.

When a power switch 54 is operated, a system controller 50 activates a power circuit 56, and the power circuit 56 supplies to a whole system DC voltage generated based on a battery 58. A CPU 46 starts-up a signal processing block including a TG 18, a signal processing circuit 26, and others, and an encode block including a video encoder 32, a monitor (display) 34, and others.

The timing generator (TG) 18 generates a timing pulse for driving the photographing device 16, and a raw image signal (camera signal) generated on the light-receiving surface is read out from the photographing device 16 in response to the timing pulse. It is noted that as for the timing pulse, in addition to a vertical transfer pulse, and a horizontal transfer pulse, there are an electric charge sweep-out pulse for sweeping electric charges generated by a charge-coupled device (not shown) to an overflow drain (not shown) during a non-exposure time, that is, non-electric charge accumulating period, and others.

The camera signal outputted from the photographing device 16 is subjected to a correlation double sampling and a gain adjustment in a CDS circuit 20 and an AGC circuit 22. The camera signal to which the gain adjustment is subjected is applied to the signal processing circuit 26 via an A/D converter 24. The signal processing circuit 26 subjects the applied camera signal to signal processings such as a color separation, a white balance adjustment, a YUV conversion, and others before outputting a YUV signal. The YUV signal is written into an SDRAM 30 by a memory control circuit 28.

The YUV signal written in the SDRAM 30 is read out by a memory control circuit 28 based on a read-out request outputted from a video encoder 32. The read YUV signal is converted into a composite image signal by the video encoder 32, and a converted composite image signal is applied to a monitor 34. As a result, a moving image of an object (through image) is displayed on the monitor 34 in a real time fashion.

When an operator operates a shutter button 52, the system controller 50 applies a corresponding state signal to the CPU 46. The CPU 46 performs a focus adjustment and an exposure adjustment, and thereafter instructs a TG 18 and a JPEG CODEC 40 respectively to carry out an primary exposure and a compression process. The TG 18 subjects the photographing device 16 to the primary exposure, and reads out a resultant one screen of the camera signal from the photographing device 16. The TG 18 is deactivated at a time of completing reading out one screen of the camera signal. The read camera signal is converted into the YUV signal according to the above-described procedure, and the converted YUV signal is retained in the SDRAM 30. The JPEG CODEC 40 reads out the YUV signal based on the primary exposure from the SDRAM 30 through the memory control circuit 28, and subjects the read YUV signal to a JPEG compression. The resultant compressed YUV signal is recorded into a memory card 48 by the CPU 46.

Figure 2:
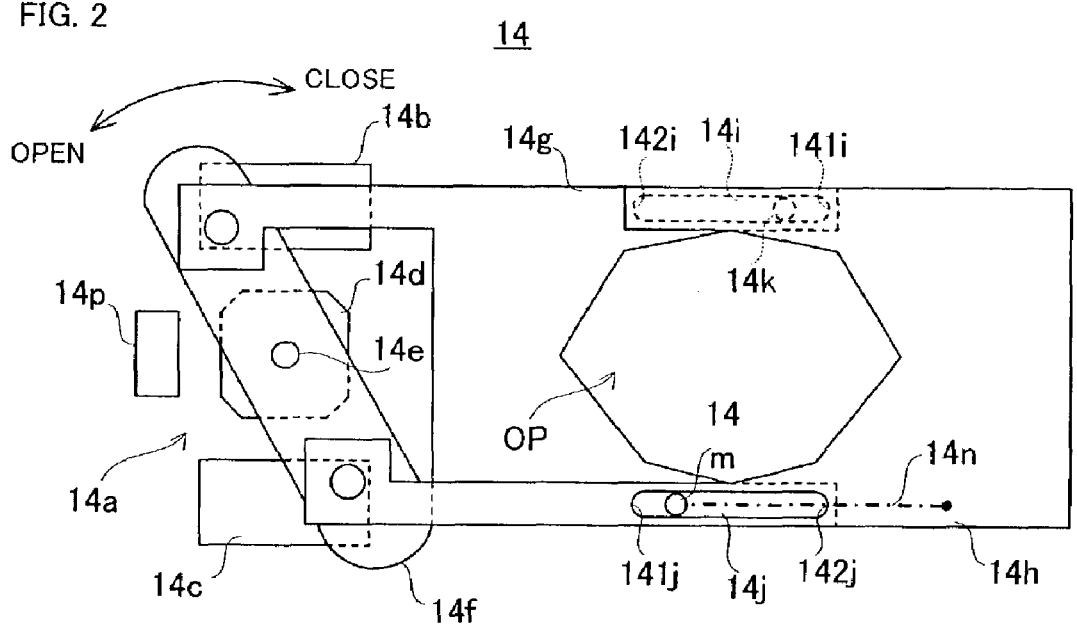
FIG. 2 is an illustrative view showing an aperture apparatus.

An aperture apparatus 14 is structured as shown in FIG. 2. A motor 14a is formed of two magnets 14b, 14c, and a moving coil 14d. At the center of the moving coil 14d, a shaft 14e extending toward an optical axis direction is provided, and a lever 14f is attached to the shaft 14e. Two aperture blades 14g and 14h are held at both ends in a longitudinal direction of the lever 14f.

As a result of a current being supplied to the moving coil 14d, the moving coil 14d itself rotates, and the lever 14d turns toward a direction perpendicular to the optical axis. The aperture blades 14g and 14h move toward an opposite direction to each other in a direction perpendicular to the optical axis. However, long holes 14i and 14j extending toward a moving direction are formed on the aperture blades 14g and 14h, respectively, and pins 14k and 14m protruding toward the optical axis direction are engaged with the long holes 14i and 14j, respectively. Consequently, a moving amount of the aperture blades 14g and 14h is restricted by the pins 14k and 14m.

When the pin 14k contacts one end 141i of the long hole 14i, and the pin 14m contacts one end 141j of the long hole 14j, an aperture OP defined by the aperture blades 14g and 14h opens most widely, and an F number shows a minimum value. In contrary, when the pin 14k contacts the other end 142i of the long hole 14i, and the pin 14m contacts the other end 142j of the long hole 14j, the aperture OP fully closes, which cuts-off an incident light toward the photographing device 16. The pin 14m is connected to the aperture blade 14h by an elastic member 14n that likens to a spring, and elasticity toward which the aperture OP is closed is always applied to the aperture blade 14h. In the vicinity of the moving coil 14d, a hole element 14p is provided. The hole element 14p produces a plus output and a minus output, and a plus output level changes according to a rotating degree of the lever 14f, i.e. the F number.

Figure 3:
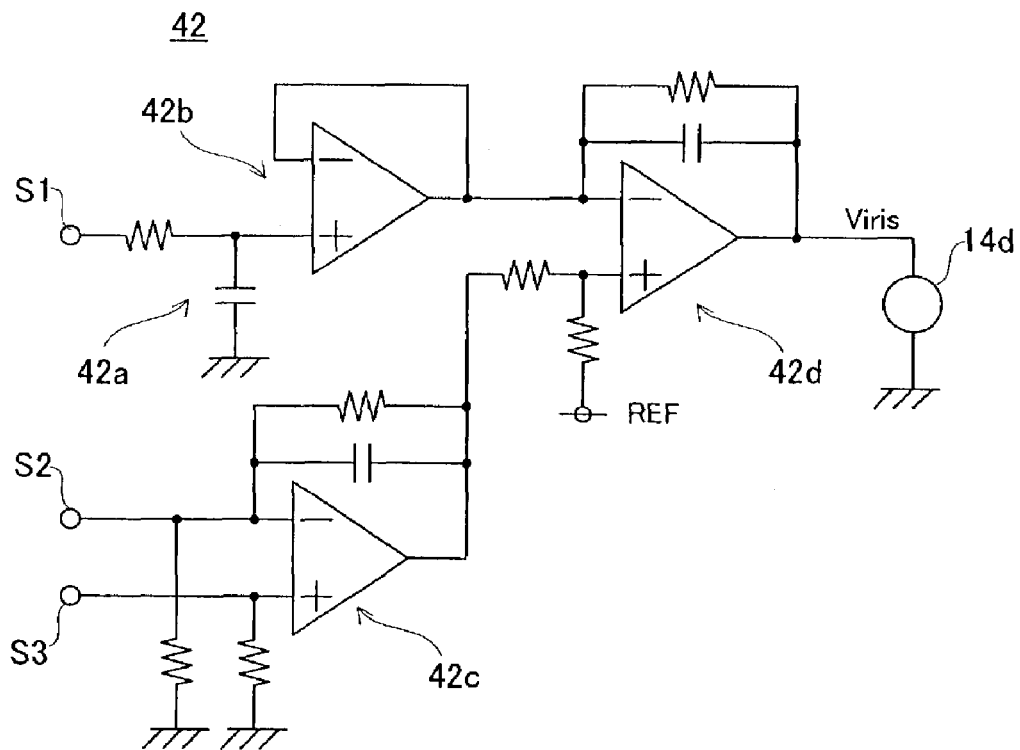
FIG. 3 is a circuit diagram showing a driver for driving the aperture apparatus.
Figure 4:
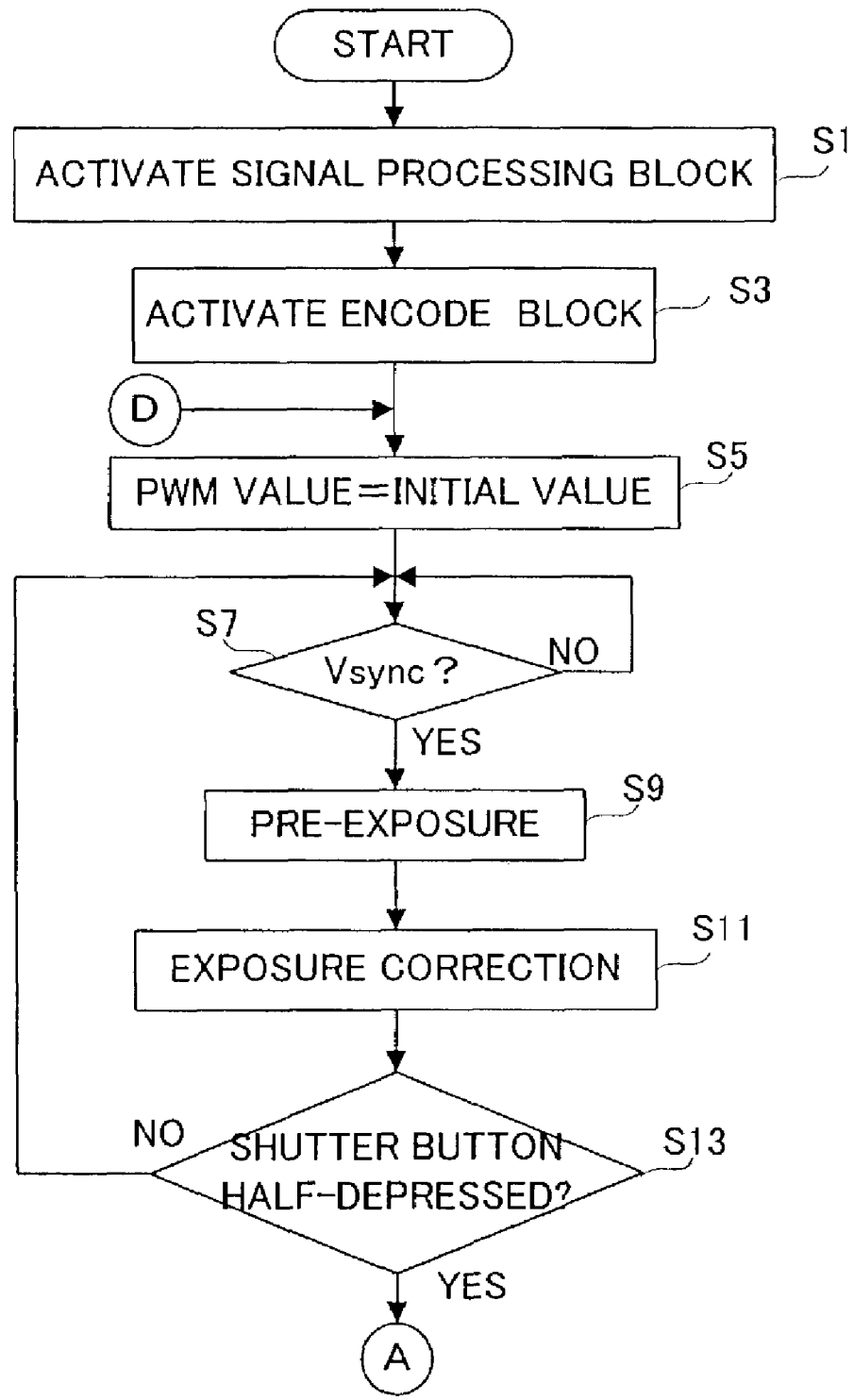
FIG. 4 is a flowchart showing one portion of an operation of the FIG. 1 embodiment.
Figure 5:
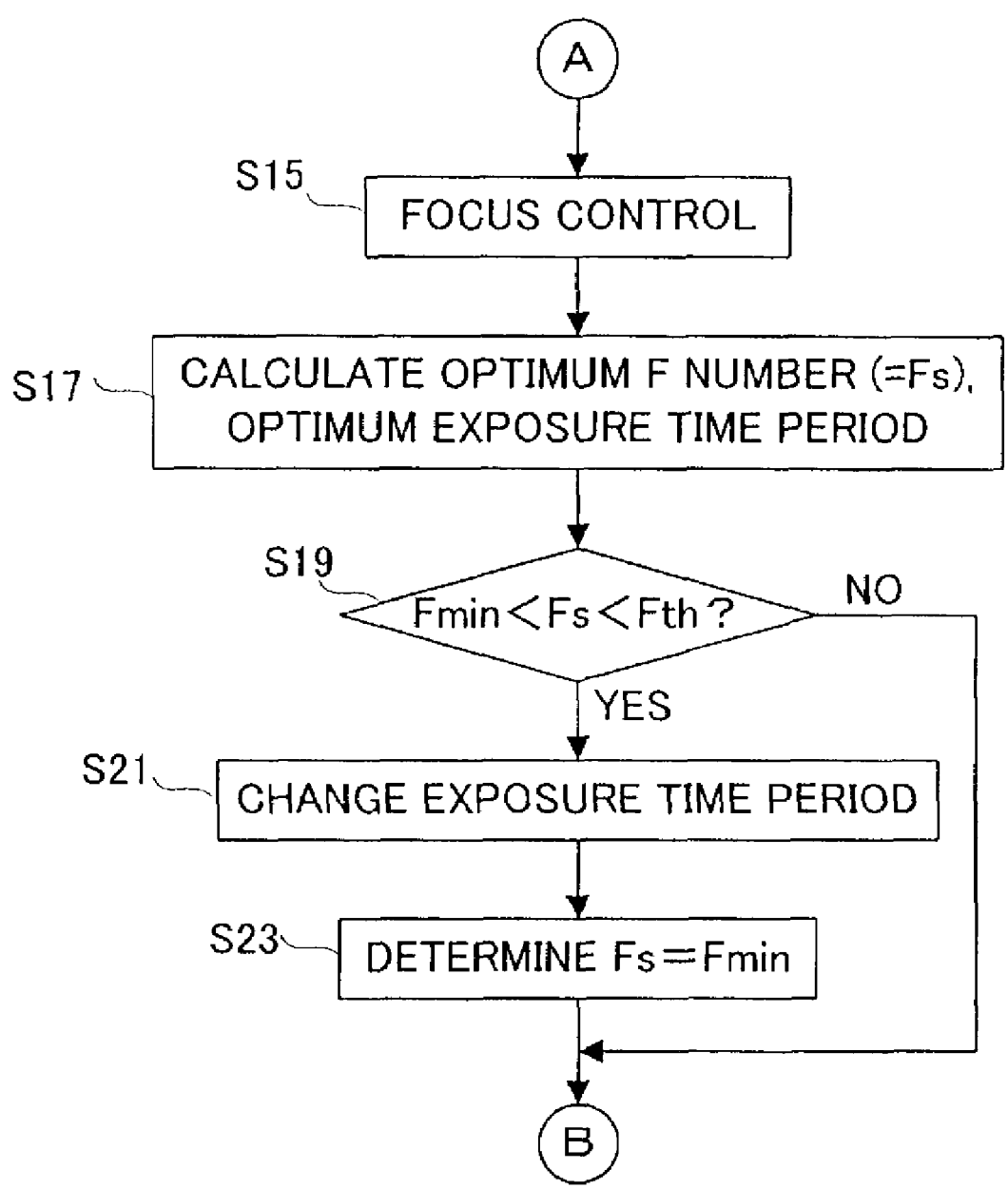
FIG. 5 is a flowchart showing another portion of the operation of the FIG. 1 embodiment.
Figure 6:
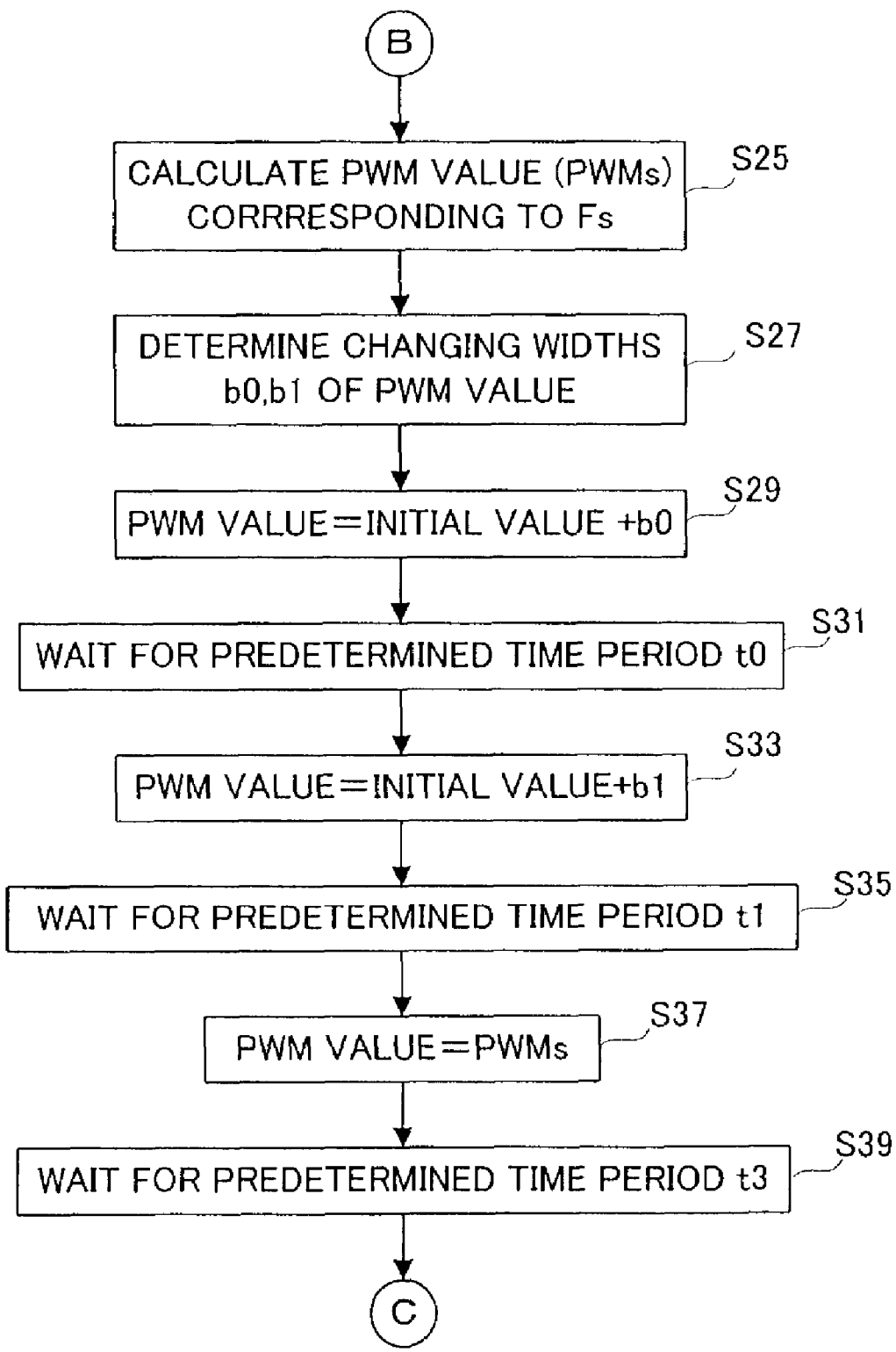
FIG. 6 is a flowchart showing the other portion of the operation of the FIG. 1 embodiment.
Figure 7:
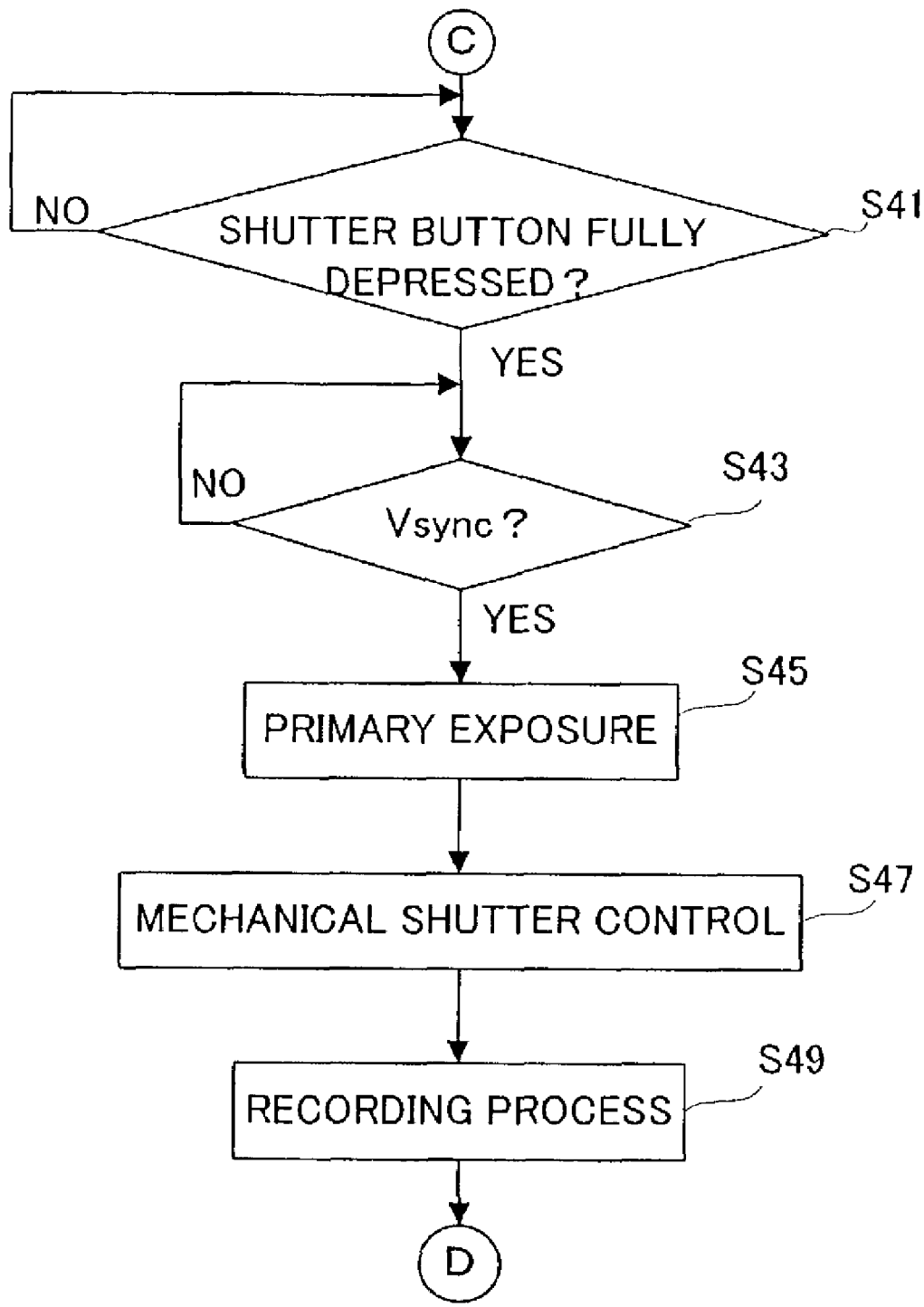
FIG. 7 is a flowchart showing a further portion of the operation of the FIG. 1 embodiment.

A driver 42 is structured as shown in FIG. 3. As a result of a PWM signal being applied from the CPU 46 to a terminal S1, the PWM signal is applied to a non-inversion input terminal of an operational amplifier 42b via a smoothing circuit 42a. At an output terminal of the operational amplifier 42b, a level that corresponds to a duty of the PWM signal appears. This level is defined as a PWM output. The plus output and the minus output of the hole element 14p shown in FIG. 2 are applied to an inversion input terminal and the non-inversion input terminal of an operational amplifier 42c via terminals S2 and S3. At an output terminal of the operational amplifier 42c, a level that corresponds to a difference of the plus output and the minus output appears. This level is defined as a hole element output. The PWM output and the hole element output are subjected to a differential amplification process by an operational amplifier 42d, and driving voltage Viris of the moving coil 14d is obtained as a result thereof. Therefore, the driving voltage Viris is defined by a duty ratio of the PWM signal and the plus output level of the hole element 14p, that is, the F number.

When the voltage is input, the CPU 46 processes flowcharts shown in FIG. 4-FIG. 7. First, a signal processing block and an encode block are activated in steps of S1 and S3, respectively. In a step S5, a PWM signal having the PWM value (=pulse width) of an initial value is applied to the driver 42 so as to set the F number of the aperture apparatus 14 to the initial value. The initial value of the F number is a value that a predetermined value a is added to a minimum value Fmin. This prevents the pins 14h and 14m shown in FIG. 2 from colliding with the one end 141i of the long hole 14i and the other end 141j of the long hole 14j.

It is determined whether or not a vertical synchronization signal is produced in a step S7. The vertical synchronization signal is produced at a head of each field, and if YES in the step S7, a pre-exposure is instructed to the TG 18 in a step S9 and an exposure correction is performed in a step S11. It is determined whether or not the shutter button 52 is half-depressed in a step S13, and the processes of steps S7-S11 are repeated until YES is determined.

The TG 18 subjects the photographing device 16 to the pre-exposure in response to the pre-exposure instruction in the step S9, and reads out from the photographing device 16 the camera signal generated by the pre-exposure. As a result, a through image is displayed on the monitor 34 while the shutter button 52 is not depressed.

A luminance evaluation circuit 36 shown in FIG. 1 integrates a Y signal generated based on the pre-exposure of a preceding field for a one frame period so as to evaluate a luminance evaluation value. In the step S11, the F number is adjusted in such a manner as to obtain an optimum exposure amount based on the luminance evaluation value outputted from the luminance evaluation circuit 36. At this time, basically, an exposure time period is a fixed value. However, when the optimum exposure amount is not obtained unless the F number is set to the minimum value Fmin, the F number is set to a value other than the minimum value Fmin by changing the exposure time period. Thus, it is prohibited to set the minimum value Fmin while the through image is displayed.

It is noted that the pre-exposure time period in the step S9 is controlled only by an electronic shutter function of the TG 18. That is, an output of an electric charge sweep-out pulse is intercepted at an exposure starting timing, and an output of the electric charge sweep-out pulse is resumed after reading out the electric charges accumulated in the charge-coupled device.

If the shutter button 52 is half-depressed, a focus control is performed in a step S15. More specifically, the focus lens 12 is gradually moved to the optical axis direction by controlling the driver 44, the pre-exposure is instructed to the TG 18 in each step, and the focus evaluation value based on the pre-exposure is fetched from the focus evaluation circuit 38. Then, a focal point is detected based on a plurality of the fetched focus evaluation values so as to set the focus lens 12 to the focal point.

In a step S17, the luminance evaluation value is fetched from the luminance evaluation circuit 36 so as to calculate an optimum F number that defines the optimum exposure amount (=optimum value Fs), and an optimum exposure time period based on the luminance evaluation value. In a step S19, it is determined whether or not the calculated optimum value Fs satisfies a condition that Fmin smaller than (<) FS smaller than (<) Fth. Fth is a value larger by a predetermined value than the minimum value Fmin. When the optimum value Fs does not satisfy the condition, the process directly advances to a step S25. In contrary, when the optimum value Fs satisfies the condition, the exposure time period is changed according to Equation (1) in a step S21, and the optimum value Fs is changed to the minimum value Fmin, i.e. the minimum F number in a step S23 before advancing to the step S25. It is noted that in the step S23, only the minimum value Fmin is determined as the optimum value Fs, and the aperture apparatus 14 is controlled in steps that follow S25.

$$\text{Changed exposure time period} = \text{optimum exposure time period} * (Fmin/Fs)^2 \quad (1)$$

The PWM value (=PWMs) capable of setting the F number to the optimum value Fs is calculated in the step S25, and changing widths b0 and b1 of the PWM value are determined in a step S27. The changing widths b0 and b1 are determined according to Equation (2).

$$b0 = (\text{initial value} - PWMs) * (\tfrac{2}{3})$$

$$b1 = (\text{initial value} - PWMs) * (\tfrac{1}{3}) \quad (2)$$

The PWM signal having the PWM value of "initial value+b0" is applied to the driver 42 in a step S29, and waits for a predetermined time period t0 in a step S31. In a step S33, the PWM signal having the PWM value of "initial value+b1" is applied to the driver 42, and waits for a predetermined time period t1 in a step S35. In a step S37, the PWM signal having the PWM value of the PWMs is applied to the driver 42, and waits for a predetermined time period t2 in a step S39. This gradually changes the F number from the initial value to the optimum value Fs.

Upon completion of setting the F number, it is determined whether or not the shutter button 52 is fully depressed in a step S41. If YES, the process advances from a step S43 to a step S45 in response to a generation of the vertical synchronization signal so as to instruct the primary exposure to the TG 18. Furthermore, the aperture apparatus 14 is activated as a mechanical shutter at a predetermined timing in a step S47.

Figure 12:
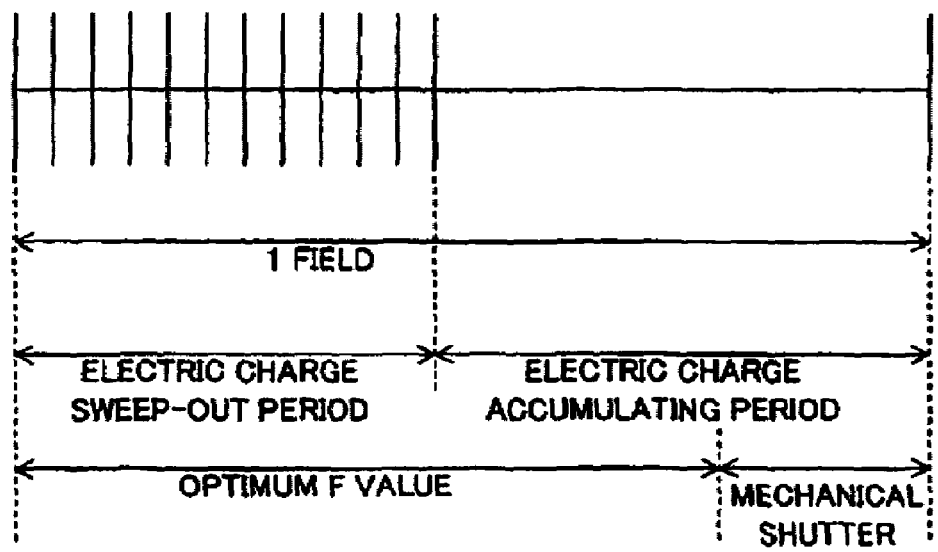
FIG. 12 is a timing chart showing one portion of an operation of a photographing device and an aperture apparatus.

A starting timing and an ending timing of the primary exposure are determined based on the optimum exposure time period calculated in the step S17 or the exposure time period changed in the step S21. In addition, the start of the primary exposure is controlled by an electronic shutter function of the TG 18, and the end of the primary exposure is controlled by a mechanical shutter function of the aperture apparatus 14. That is, referring to FIG. 12, the TG 18 repeats to perform the electric charge sweep-out from a head of a one field period during which the primary exposure is carried out, and suspends the electric charge sweep-out in a primary exposure starting timing. This starts accumulating electric charges, i.e. the primary exposure. The aperture apparatus 14 starts driving the aperture blades 14g and 14h in a primary exposure ending timing. The primary exposure is ended at a time that the aperture blades 14g and 14h are completely closed.

Upon completion of the primary exposure, the TG 18 reads out from the photographing device 16 the electric charges accumulated in the charge-coupled device, that is, the camera signal. The read camera signal is applied to the signal processing circuit 26 via a CDS circuit 20, an AGC circuit 22, and the A/D converter 24 before being converted into the YUV signal. The converted YUV signal is stored into the SDRAM 30 by the memory control circuit 28.

The YUV signal stored in the SDRAM 30 is subjected to a recording process in a step S49. More specifically, the JPEG CODEC 40 is instructed to carry out a compression process, and a compressed YUV signal generated by the JPEG CODEC 40 is recorded into the memory card 48. The process returns to the step S5 after completing the recording process.

Figure 8:
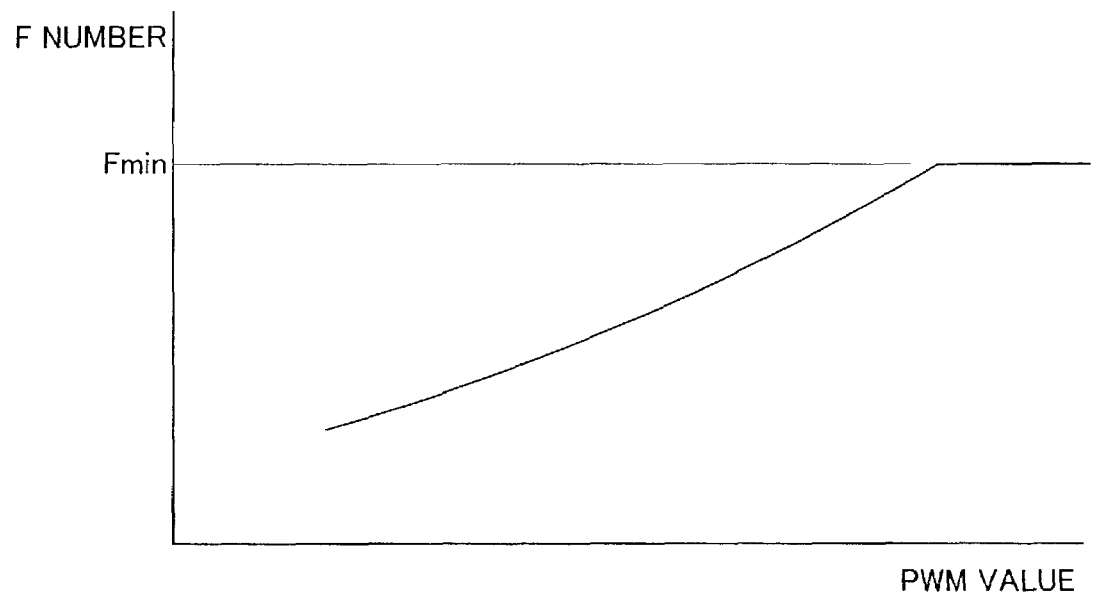
FIG. 8 is a graph showing a relationship between a PWM value and an F number.

A relationship between the PWM value and the F number is shown in FIG. 8. The F number decreases in proportion to an increase of the PWM value. However, if the PWM reaches a predetermined value, the pin 14k shown in FIG. 2 contacts the one end 141i of the long hole 14i, and the pin 14m contacts the other end 141j of the long hole 14j. At this time, the F number becomes the minimum value Fmin, and the F number keeps retaining the minimum value Fmin even if the PWM value exceeds the predetermined value.

Figure 9:
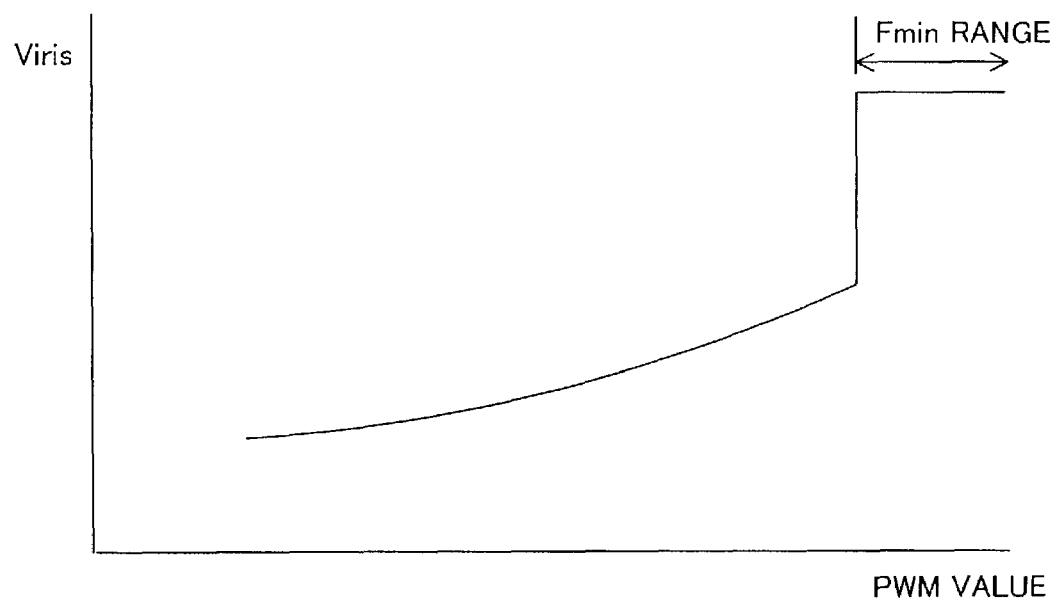
FIG. 9 is a graph showing a relationship between the PWM value and driving voltage of the aperture apparatus.

A relationship between the PWM output and the driving voltage Viris is shown in FIG. 9. The driving voltage Viris increases in proportion to an increase of the PWM value, which decreases the F number. However, an output of the hole element 14p remains constant regardless of the increase of the PWM value after the aperture OP shown in FIG. 2 is opened most widely. This rapidly increases the driving voltage Viris, greatly consuming electricity. That is, a consumed electricity when setting the F number to the minimum value Fmin spends more electricity than setting the F number to a value other than the minimum value Fmin. In this embodiment, it is prohibited to set the F number to the minimum value Fmin when outputting the through image, which prevents the consumed electricity from increasing. This makes it possible to prolong longevity of the battery 58.

Figure 10:
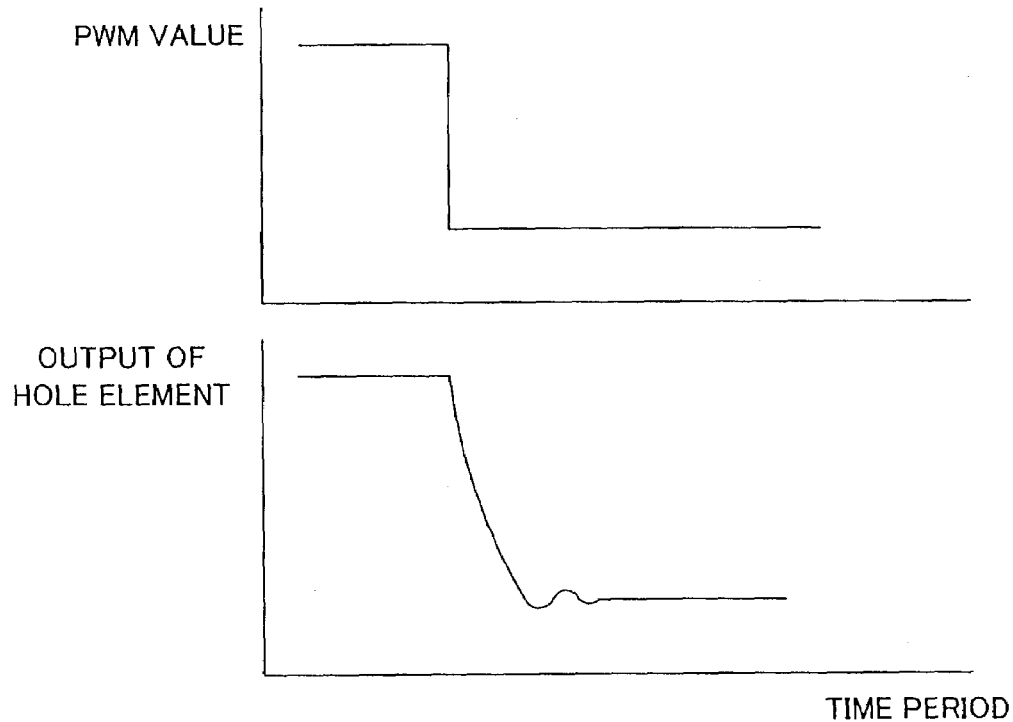
FIG. 10 is a timing chart showing one portion of an operation of an aperture blade in a prior art.
Figure 11:
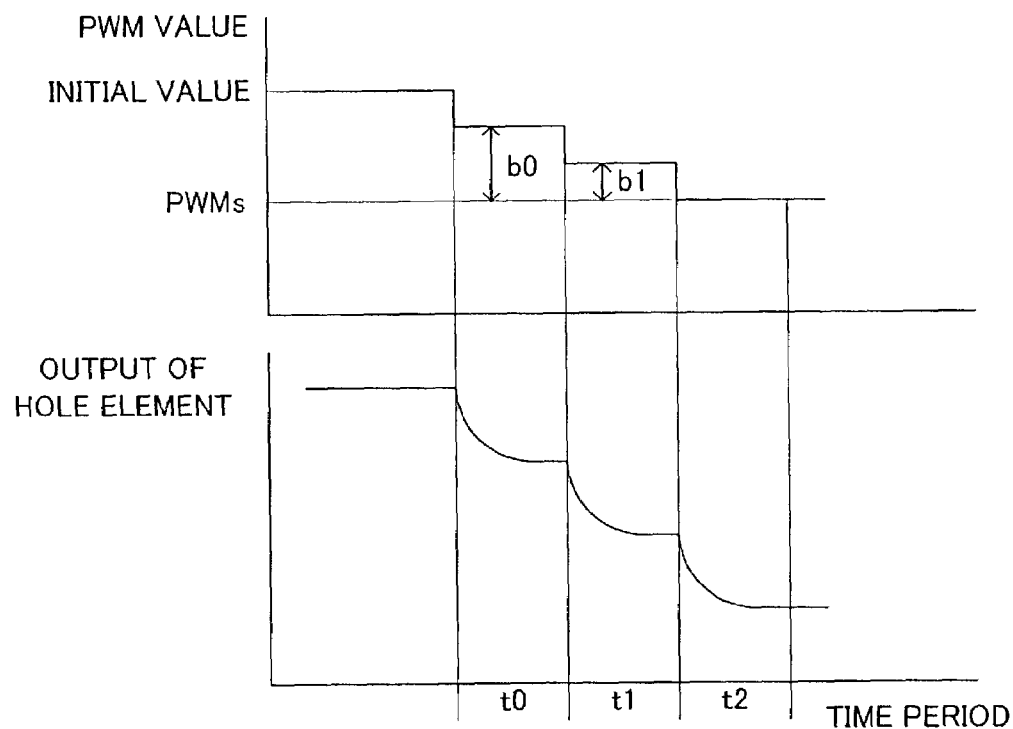
FIG. 11 is a timing chart showing one portion of an operation of the aperture blade in the FIG. 1 embodiment.

Furthermore, if the PWM value is rapidly changed, the aperture blades 14g and 14h are greatly moved. At this time, a transient response as shown in FIG. 10 occurs to an output waveform of the hole element 14p. In this embodiment, the PWM value is to be gradually updated when setting the F number to the optimum value Fs so that the output waveform of the hole element 14p changes as shown in FIG. 1. This restraints an unstable movement due to the transient response, thus possible to exactly set the F number. Furthermore, there is a hysteresis in the moving coil 14d that drives the aperture blades 14g and 14h, and in this embodiment, the aperture blades 14g and 14h only move to a single direction when setting the F number to the optimum value Fs. This makes it possible to appropriately adjust the F number regardless of the hysteresis.

Figure 13:
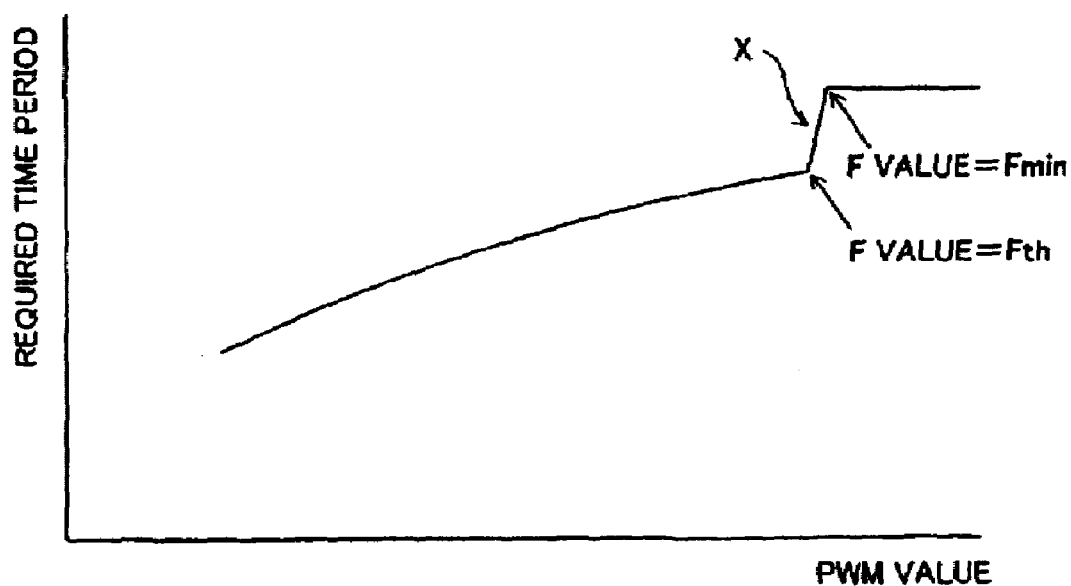
FIG. 13 is a graph showing a relationship between the PWM value and a required time that the aperture blade closes fully.

A relationship between the PWM value and a required time period when activating the aperture apparatus 14 as the mechanical shutter (a required time period for the aperture OP to be fully close) is shown in FIG. 13. The aperture OP is opened widely in proportion to an increase of the PWM value, and therefore, the required time period for fully closing the aperture OP becomes longer approximately in proportion to the increase of the PWM value. It is noted that in the vicinity of an X of the minimum value Fmin, the required time period drastically becomes long. That is, a big difference in the required time occurs between the minimum value Fmin and the predetermined value Fth. This, in the vicinity of the X of the minimum value, results in a very large difference in the required time period when a difference occurs between the desired F number and the F number actually set.

In a case of, in reality, setting the minimum value Fmin in spite of being intended to set a value slightly higher than the minimum value Fmin, for example, a large difference occurs to the required time period. In this embodiment, when the calculated optimum value Fs of the F number belongs to a range of Fmin (<) smaller than Fs (<) smaller than Fth, the optimum value Fs is changed to the minimum value Fmin. This makes it possible to exactly control the mechanical shutter.

It is noted that when outputting the through image, it is prohibited to set the F number to the minimum value Fmin in order to restrain the consumed electricity from increasing. In contrary, the F number being changed to the minimum value Fmin when the optimum F number (=Fs) at a time of the primary exposure is included in the above-described range attributes to a fact that a time period that the F number is set to the minimum value Fmin for the primary exposure is quite short, an increase of the consumed electricity is not a major problem, and it is more important to obtain as much exposure amount as possible than restraining the consumed electricity.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A video camera that displays a moving image of an object photographed by an image sensor in a real time fashion, and records into a recording medium a still image of said object photographed by said image sensor in a desired timing, comprising:
   an aperture blade for adjusting an amount of an incident light into said image sensor by moving toward a direction perpendicular to a light axis;
   a restricting member for restricting a moving amount of said aperture blade in order to define a minimum F number;
   a prohibitor for prohibiting a setting of said minimum F number when displaying said moving image; and
   an allower for allowing a setting of said minimum F number when recording said moving image.

2. A video camera according to claim 1, wherein
   said aperture blade has a hole extending to a moving direction, and
   said restricting member has a protruding portion engaged with said hole.

3. A video camera according to claim 1, further comprising a motor for transmitting power to said aperture blade.

4. A video camera, comprising:
   an aperture blade for adjusting an amount of an incident light into an image sensor by moving toward a direction perpendicular to a light axis;
   a restricting member for restricting a moving amount of said aperture blade in order to define an opening terminal corresponding to a minimum F number;
   an optimum F number calculator for calculating an optimum F number that defines an optimum exposure amount when an exposure adjusting instruction is applied;
   an exposure time period specifier for specifying an exposure time period that defines in cooperation with said optimum exposure amount said minimum F number when said optimum F number is included in a predetermined range;
   an aperture blade mover for moving said aperture blade to said opening terminal when said optimum F number is included in said predetermined range;
   a cutter for cutting-off an incident light into said image sensor by completely closing said aperture blade in a timing according to said exposure time period when a recording instruction is applied after said exposure time period adjusting instruction; and
   a recorder for recording a still image signal outputted from said image sensor after a cutting-off by said cutter.

5. A video camera according to claim 4, wherein said cutter includes a transmitter for transmitting power to said aperture blade, and said predetermined range is present in the vicinity of said minimum F number.

6. A video camera according to claim 5, wherein
   said aperture blade has a hole extending toward a moving direction, and
   said restricting member has a protruding portion engaged with said hole.

7. A video camera, comprising:
   an image sensor for generating an image signal corresponding to an optical image irradiated onto a light-receiving surface;
   an aperture blade for adjusting an incident light amount into said image sensor by moving toward a direction perpendicular to a light axis;
   a first calculator for calculating an optimum F number of said aperture blade based on said image signal;
   a second calculator for calculating a changing amount necessary for changing the F number of said aperture blade to said optimum F number;
   a determiner for determining a plurality of partial changing amounts whose summation is equal to the changing amount calculated by said second calculator; and
   a changer for gradually changing the F number of said aperture blade
   to only one of a first direction in which a numerical value decreases and a second direction in which the numerical value increases with reference to the plurality of partial changing amounts determined by said determiner.

8. A video camera according to claim 7, further comprising a hole element that generates a voltage signal corresponding to the F number of said aperture blade, wherein said changer changes said F number based on the voltage signal.

9. A video camera according to claim 7, wherein
   said image sensor outputs a still image signal when a recording instruction is applied, and
   said first calculator calculates said optimum F number in response to an exposure adjusting instruction, which is prior to said recording instruction.

* * * * *